United States Patent [19]

Norton et al.

[11] 4,016,086

[45] * Apr. 5, 1977

[54] POLYACRYLAMIDE POLYMERS DERIVED FROM ACRYLONITRILE WITHOUT INTERMEDIATE ISOLATION

[75] Inventors: Charles J. Norton; David O. Falk, both of Denver, Colo.

[73] Assignee: Marathon Oil Company, Findlay, Ohio

[ * ] Notice: The portion of the term of this patent subsequent to July 24, 1990, has been disclaimed.

[22] Filed: Jan. 26, 1972

[21] Appl. No.: 220,910

[52] U.S. Cl. .......................... 252/8.55 D; 166/274; 166/275
[51] Int. Cl.² ........................................ E21B 43/22
[58] Field of Search ............. 252/8.55 D; 166/273, 166/274, 275

[56] References Cited

UNITED STATES PATENTS

| | | | |
|---|---|---|---|
| 2,761,834 | 9/1956 | Suen et al. | 260/79.3 X |
| 3,002,960 | 10/1961 | Kolodny | 252/8.55 X |
| 3,020,953 | 2/1962 | Zerweck et al. | 252/8.55 X |
| 3,023,242 | 2/1962 | Bornemann et al. | 260/89.7 X |
| 3,085,063 | 4/1963 | Turbak | 252/8.55 |

OTHER PUBLICATIONS

Acrylonitrile, M. Sittig Chemical Process Monograph No. 14, 1965, pp. 61–64.

Carpenter et al., Acrylamide–Its Preparation and Properties, Article in J. Appl. Chem., vol. 7, 1957, pp. 671 and 672.

*Primary Examiner*—Herbert B. Guynn
*Attorney, Agent, or Firm*—Joseph C. Herring; Jack L. Hummel

[57] ABSTRACT

Hydrolyzed and neutralized acrylonitrile is polymerized in solution without isolation to produce a high molecular weight polyacrylamide useful for mobility control in supplemented recovery of petroleum. The polyacrylamide optionally may be hydrolyzed, and/or methylolated and/or sulfomethylated.

5 Claims, No Drawings

4,016,086

POLYACRYLAMIDE POLYMERS DERIVED FROM ACRYLONITRILE WITHOUT INTERMEDIATE ISOLATION

CROSS REFERENCES TO RELATED APPLICATIONS

The following United States patent applications relate to the general field of the present invention: Ser. No. 163,642, filed July 19, 1971, now U.S. Pat. No. 3,743,018 and Ser. No. 193,740, filed Oct. 29, 1971, now No. 3,760,879.

BACKGROUND OF THE INVENTION

1. Field of the Invention

The present invention relates to the injection into formations of fluids comprising water classified in Class 166, subclasses -275 and -305 of the United States Patent Office Classification System.

2. Description of the Prior Art

The prior art reviewed in the aforementioned copending applications is of general pertinence to the present application.

J. Polymer Science I, page 180, sets forth the various synthesis routes from acrylonitrile to acrylamide. "Acrylonitrile" M. Sittig Chemical Process Monograph No. 14 (1965) pp. 61–64 discusses uses of acrylamides, general methods for its hydrolysis reaction and suitable conditions therefor. U.S. Pat. No. 3,023,242 teaches yield versus reaction time relationship in the preparation of monomeric acrylic acid amide from acrylonitrile. "Acrylamide, Its Preparation and Properties," by E. L. Carpenter and H. S. Davis, J. Appl. Chem. 7, p 672 (1957) describes conversion of acrylonitrile into acrylamide with concentrated hydrochloric acid to form betachloropropionamide followed by elimination of hydrogen chloride by treatment with potassium carbonate, or aqueous caustic and also describes preparation of acrylamide by hydrolysis of acrylonitrile with sulfuric acid monohydrate in the presence of a polymerization inhibitor.

None of the above prior art teaches polymerization of hydrolyzed and neutralized acrylonitrile in solution and without isolation to conveniently produce high molecular weight polyacrylamide useful in the control of viscosity of aqueous solutions used in supplemented recovery of petroleum, with or without hydrolysis and/or methylolation and/or sulfomethylation of such polyacrylamide.

SUMMARY OF THE INVENTION

General Statement of the Invention

According to the invention, acrylonitrile is hydrolyzed e.g., with sulfuric acid monohydrate, neutralized e.g., with calcium carbonate, maintained as a slurry without isolation, and then (after filtering off the calcium sulfate precipitate) polymerized, preferably at pH 7 to about 9, preferably in the presence of a polymerization catalyst, e.g., triethanolamine/ammonium persulfate. Preferably a polymerization inhibitor, e.g., copper sulfate, is added with the reactants of the hydrolysis step and removed prior to polymerization. The finished acrylamide may be utilized without further treatment or its viscosity increasing properties may be enhanced by hydrolysis and/or methylolation and/or sulfomethylation.

By going from acrylonitrile (about $0.14 per pound commercial value) to polyacrylamide (about $1.20 commercial price) without intermittent recovery, the present invention provides a substantial savings in both capital investment and operating costs. Further, the simplicity of the equipment permits the use of portable processing units capable of being moved on site to locations, e.g., supplemented oil recovery operations in which large quantities of polyacrylamide are to be consumed. This on-site production can provide substantial further savings in transportation costs.

In particularly preferred further embodiments of the invention, the polyacrylamide can be hydrolyzed, e.g., by treatment with sodium hydroxide or other bases to enhance the polyionic character. In general, enhancing the polyionic character of mobility control agents used in supplemented recovery of petroleum, provides enhanced recovery. Achieving this enhancement of polyionic characters through partial hydrolysis or the use of methylol or sulfonate groups provides a mobility control agent with good ability to sustain viscosity in the presence of brine and lime, usually present in the connate waters of petroleum-bearing formations.

The present invention first converts, in situ, hydrolyzed neutralized acrylonitrile into acrylamide monomer which is in turn, without isolation, polymerized into polyacrylamide. The polyacrylamide can then subsequently, without isolation, be partially hydrolyzed as mentioned above, or can be methylolated by treatment with formaldehyde. In still more preferred embodiments, the recovery of petroleum can be substantially further enhanced by sulfomethylating such polymer by treatment with formaldehyde and metallic bisulfite, sequentially or simultaneously. Such sulfomethylated polyacrylamides provide a high level of sulfonate groups per molecule with the attendant enhanced ionic character and petroleum recovery efficiency.

Techniques for the methylolation and the sulfomethylation of the polymers of the present invention are more fully discussed in the aforementioned copending U.S. Pat. application Ser. No. 193,740, filed Oct. 29, 1971, now No. 3,760,879.

UTILITY OF THE INVENTION

The present invention, by increasing the viscosity and oil recovery efficiency, provides substantially improved recoveries and economies when used as, or in connection with, displacement fluids for the recovery of petroleum from subterranean formations. In addition, the compositions and processes of the present invention can be utilized for the formulation of controlled density fluids, e.g., for ore flotation, liquid-solid separation processes, etc. "Screen factor" is determined according to the techniques of Paper No. SPE 2867 of the Society of Petroleum Engineers of the American Institute of Mining Engineers, which paper also describes the screen viscometer and screen factor discussed later in this application.

DESCRIPTION OF THE PREFERRED EMBODIMENTS

STARTING MATERIALS

The acrylonitrile useful for the present invention is the usual commercial grade though high purities may be utilized where this is especially desirable.

Sulfuric acid can be oleum, or lower percentages, e.g., 90% $H_2SO_4$ down to about 85% $H_2SO_4$.

From about 0.25 to about 3.0, more preferably from about 0.50 to about 1.5, and most preferably from about 0.75 to about 1.0 moles of water will be used for each mole of sulfuric acid.

Copper salts, e.g., copper chloride, copper nitrate, cupric sulfate, can be employed so long as they are soluble in the reactants and provide ionic copper to inhibit the polymerization of by product acrylic acid formed during the hydrolysis of the acrylonitrile.

From about 0.0001 to about 0.010, more preferably from about 0.0005 to about 0.005, and most preferably from about 0.001 to about 0.01 moles of copper (in the form of copper salts) will be used for each mole of acrylonitrile.

The base used for neutralization after the hydrolysis of the acrylonitrile can be any economical base, e.g., calcium hydroxide, lime slurry, gaseous ammonia, sodium carbonate, sodium hydroxide, potassium carbonate, potassium hydroxide. In general, the choice of base will be chosen to give the most valuable and conveniently marketable byproduct salt, e.g., sodium hydroxide gives the relatively low valued glaubers salt, and to give a salt which has sufficiently low solubility in water to permit its easy removal.

Copper precipitation, after hydrolysis and before polymerization, is preferably accomplished by the addition of sodium phosphate which both sequesters and precipitates substantially the copper from the neutralized acrylamide solution. Alternatively, other materials, e.g., ion exchange resins can be used to remove the copper from the acrylamide monomer solution. Sodium phosphate will generally be utilized in the range of from about 0.25 to about 3.0, more preferably from about 0.50 to about 1.5, and most preferably from about 0.75 to about 1.0 moles per mole of copper present in the solution.

Water: Water for dissolving the copolymer and the polymer will preferably be fresh water but can be brackish or slightly saline, e.g., connate water. In some situations there may be some advantage in partial treatment of the water to remove deleterious impurities.

Formaldehyde: The formaldehyde utilized in the methylolation of the polyacrylamide polymer can be in the form of a liquid solution (formalin) preferably containing about 37% by weight formaldehyde which is the normal commercially available strength. The percent by weight of formaldehyde in the solution is not narrowly critical but can be adjusted to give the desired incorporation into the product. The formaldehyde can be in a gaseous state and bubbled directly into the aqueous solution of polymer. Also, paraformaldehyde can be employed either by heating to form gaseous formaldehyde or by dissolving directly into the aqueous solution of polymer. Preferably from about 0.01 to about 10.0, more preferably from about 0.1 to about 5, and most preferably from 0.5 to about 3 moles of formaldehyde per mole of acrylamide monomer unit will be used in the invention.

Sulfites: The sulfites for use with the present invention will be inorganic sulfites, including ammonium sulfite which acts like a metal sulfite. "Sulfites" also includes bisulfites and metabisulfites. Sodium sulfite or bisulfite is the preferred source of sulfite ion. However, any non-interfering compound which forms bisulfite or sulfite ions in the reaction mixture may be utilized. By "non-interfering bisulfites" is meant those sulfite-forming compounds which do not cause undesirable side effects, including among others: alkali metal sulfites, alkaline earth metal sulfites, alkali bisulfites, alkaline earth bisulfites, ammonium sulfite, ammonium bisulfite, and the corresponding pyrosulfites and metabisulfites. Preferably from about 0.01 to about 2.0, more preferably from about 0.05 to about 1, most preferably from about 0.1 to about 0.5 moles of sulfite per mole of acrylamide will be used in the invention.

HYDROLYSIS OF ACRYLONITRILE

As is illustrated more specifically in Example I, the sulfuric acid and water, with copper present, are combined and acrylonitrile added by dropwise addition over a reaction time of from about 0.01 to about 10.0 hours, more preferably from about 0.025 to about 5.0 hours, and most preferably from about 0.10 to about 2.5 hours. The reaction mixture is preferably agitated and is maintained at a temperature in the range of from about 30° to about 308° C., more preferably from about 40° to about 250° C., and most preferably from about 50° to about 200° C. After the addition of acrylonitrile is complete, the reaction mixture is heated for an additional period of time of from about 0.01 to about 10.0 hours, more preferably from about 0.025 to about 5.0 hours, and most preferably from about 0.10 to about 2.5 hours. After completion of the reaction, the product mixture is allowed to come to room temperature and then treated with sufficient base, e.g., calcium carbonate slurry to neutralize the product solution, and filtered. Sodium phosphate is then added to remove the copper and the resulting precipitate is removed by refiltering the solution. Centrifuging could, of course, be utilized for removing either or both precipitates.

POLYMERIZATION OF ACRYLAMIDE MONOMER

The filtrate is diluted with water to yield a solution containing approximately 5% acrylamide monomer, the triethanolamine/ammonium persulfate or other polymerization catalyst is added. (Preferably from about 0.000001 to about 0.10, more preferably from about 0.000005 to about 0.01, and most preferably from about 0.00001 to about 0.001 moles of catalyst are added for each mole of acrylamide monomer present in the solution.) The polymerization is accomplished at atmospheric pressure (though pressures above or below atmospheric may be utilized if desired) and at a temperature in the range of from about 0° to about 150° C., more preferably from about 10° to about 100° C., and most preferably from about 20° to about 60° C. The reaction chamber is preferably purged with nitrogen or other inert gas in order to remove deleterious oxygen from the vapor phase. The polymerization reaction is permitted to continue for from about 0.1 to about 100.0, more preferably from about 0.5 to about 50.0, and most preferably from 1.0 to about 10.0 hours. The finished polymer should have a molecular weight in the range of from about 1,000,000 to about 100,000,000.

PREPARATION OF SUPPLEMENTED RECOVERY FLUIDS

For purposes of the present invention, the injected aqueous solutions should contain from about 50 to about 5,000, more preferably from about 100 to about 2,000, and most preferably from about 200 to about 1,500 parts per million by weight of the acrylamide polymer. High shear mixing should be avoided as it may cause rupture of the molecule, reducing effective molecular weight and viscosity increasing properties.

HYDROLYSIS OF POLYACRYLAMIDE

Optionally, the polyacrylamide produced above can be hydrolyzed by treatment with the sodium hydroxide or other bases described above. This reaction will preferably be accomplished in the range of from about 0° to about 100°C. with the pressure normally being atmospheric, though pressures above or below atmospheric can be employed if desired. The reaction time will depend on the temperature and can best be controlled by measuring the viscosity of the resulting solution periodically.

METHYLOLATION AND/OR SULFOMETHYLATION

As mentioned above, the methylolation and/or sulfomethylation are accomplished by treating the polyacrylamide solution with formaldehyde or with both formaldehyde and sulfite under the conditions discussed below.

pH Control in formaldehyde treatment step: It has been discovered that the reaction is greatly enhanced by being conducted at a pH within the range of from about 7.5 to about 11, more preferably from 8.0 to about 10.5, and most preferably from 10 to about 10.5. The pH range can be readily achieved by the use of buffers, e.g., trisodium phosphate, triethanolamine, sodium bicarbonate-carbonate, boric acid-borate, and borax.

pH Control in sulfite treatment step: It has been discovered that the reaction with sulfite is most desirably conducted at a pH within the range of from about 9 to about 14, more preferably from about 9.5 to about 13.5, and most preferably from 10 to about 13. The pH range can readily be achieved by the use of buffers, e.g., trisodium phosphate, sodium polyphosphate, triethanolamine, sodium bicarbonate-sodium carbonate, boric acid-borate, and borax. Addition of the sulfite will itself increase the pH to within the preferred range, i.e., to approximately 12. But the addition of buffer is desirable to assist in maintaining the pH during the sulfite reaction.

Temperature in both steps: While not narrowly critical, the reaction between the formaldehyde and the polyacrylamide will preferably be conducted in the range of from about 0° to about 300° C., more preferably from about 20° to about 200° C., and most preferably from about 30° to about 100° C. The most optimal temperature for the formaldehyde addition has been found to be approximately 50° C. The contacting of the polyacrylamide with the sulfite will preferably occur at about 0° to about 300° C., more preferably 20° to 200° C., and most preferably 30° to 100° C. The most optimal temperature for the sulfite addition has been found to be about 75° C. However, as stated above, the sulfite treatment can be conducted simultaneously with the formaldehyde treatment.

Pressure: Pressure in both steps may vary widely, but will, in most cases, be conveniently near atmospheric pressure. However, where higher temperatures are to be used, additional pressure may be imposed above the reaction mixture, e.g., by the use of inert gases or by the use of compressed air in order to prevent boiling or excessive evaporation of water.

Time: Reaction time for each step (or for the combined step where formaldehyde and sulfite treatments are carried on simultaneously) is also not narrowly critical and may be in the range of from about 0.1 to about 100 hours, more preferably from about 0.5 to about 50 hours, and most preferably from about 1 to about 10 hours.

Batch or Continuous Basis: While the examples below describe the invention on a batch basis, it may, of course, be practiced on a continuous basis with continuous flows of starting materials into the reactor.

Partial Hydrolysis: It is an advantage of the present invention that the polymer is partially hydrolyzed during the sulfomethylation process. While the degree of hydrolysis is not precisely determined by available analytical techniques, it is estimated to be within the range of from about 5 to 70% hydrolysis of the amide groups which have not reacted with the formaldehyde and sulfite. This partial hydrolysis greatly increases the polarity of the molecule in the finished product, and the sulfomethylation further increases this polarity. In the resultant molecule, polar groups on the polymer tend to strongly repel each other, providing excellent dispersibility and good increase in viscosity and screen factor even in relatively dilute aqueous solutions. It is particularly important that these sulfomethylated products of the present invention maintain their high viscosity and screen factor even in the presence of calcium ions. Calcium ions are often encountered in the subterranean formations which contain oil and are known to be deleterious to conventional viscosity and screen factor-increasing agents, including unmodified partially hydrolyzed high molecular weight polyacrylamide, the most commonly used of such agents.

EXAMPLE I

HYDROLYSIS OF ACRYLONITRILE 0.1600 grams, (0.001 mole) of cupric sulfate is charged to the reaction vessel and 56 ml of 95–97% sulfuric acid and 9.0 ml of additional water, (1.0 mole each) is added to the cupric sulfate with stirring. These amounts of reactant give the ratios 1:1:1 sulfuric acid, water, and acrylonitrile.

The sulfuric acid solution is heated to 100° C. with stirring and is maintained at that temperature throughout the reaction period. 66.5 ml. (1.0 mole) of acrylonitrile is added at a rate of about one drop per three seconds. The reaction is exothermic, so an adjustment of acrylonitrile addition is made such that the reaction mixture does not require additional heat once the reaction is started.

The acrylonitrile is added over a period of about one hour, then is heated further at 60° C. for 45 minutes to complete the reaction. The reaction does not require any additional heat due to continuation of the reaction after the addition of acrylonitrile is complete.

The reaction solution is cooled to room temperature and then neutralized by the addition of 100 grams calcium carbonate (1.0 mole) slurried in 400 ml water directly to the reaction vessel. Since there is a considerable amount of gas given off, care must be taken so that the vessel is properly vented, and the addition is slow enough to prevent excessive frothing. It is also advisable to vent the gas to the hood due to dangerous unreacted acrylonitrile vapors.

The neutralized solution and precipitate is filtered through No. 3 Whatman paper and washed twice with 100 ml of water. The combined filtrate is then adjusted to pH-8 with trisodium phosphate to precipitate the copper and then filtered through Celite filter aid and No. 3 Whatman paper. An alternative method of removing copper is to pass the filtrate directly through an ion exchange resin.

The acrylamide solution obtained is a clear, white liquid.

EXAMPLE II

HYDROLYSIS OF ACRYLONITRILE WITHOUT COPPER INHIBITOR 56 ml of 95–97% sulfuric acid and 9.0 ml of water is charged to reaction vessel. The sulfuric acid is heated to 100° C. and is maintained at that temperature throughout the reaction.

66.5 ml of acrylonitrile is added at a rate of from 1 to 3 drops per 5 seconds. The acrylonitrile is added over a period of 1 hour and a white, chunky precipitate is observed during the reaction. The reaction solution is cooled and a thick gel forms around the stirring rod.

100 grams of calcium carbonate is added slowly to the reaction solution. The product is cut from the stirring rod and is extremely hard to work with. Neutralization does not take place and very little acrylamide is formed.

EXAMPLE III

POLYMERIZATION OF ACRYLAMIDE COPPER REMOVED

The concentration of acrylamide in the filtrate, from which the copper is removed in Example I, is determined and 336 ml of the monomer slution (19.5 grams 0.274 mole) is diluted to 500 ml with water. The solution is charged to the reactor and purged with nitrogen for 30 minutes; then 0.06 gram of ammonium persulfate and 0.20 gram of triethanolamine are added and the reaction is permitted to continue at room temperature for 24 hours, after which time the polymerization is substantially complete. The product formed is a viscous liquid.

EXAMPLE IV

POLYMERIZATION OF ACRYLAMIDE CONTAINING COPPER 220 ml of the filtrate from Example I, containing copper inhibitor is diluted to 500 ml with water. The solution is charged to the reactor and purged with nitrogen for 30 minutes. 0.06 gram ammonium persulfate and 0.20 gram of triethanolamine are added and the reaction permitted to continue at room temperature for 72 hours, after which time only a slight change is observed. The Brookfield viscosity is only 57 centipoise at 6 rpm. A normal polymerization would produce a much more viscous liquid.

EXAMPLE V

PARTIAL HYDROLYSIS OF POLYACRYLAMIDE 32 ml (1.25 grams) of the polymerization reaction solution from Example III is diluted to 500 ml. The solution is charged to the reactor and heated to 90° C. 26.25 ml of 0.1 normal sodium hydroxide is added and the reaction is allowed to continue for 6 hours, after which it is boiled for 20 minutes. The pH of the solution is 8.5.

The prepared solution is diluted to 2500 ml with artificial Palestine water and used as a drive fluid for a micellular system, tertiary flood, and produced excellent residual oil recovery.

EXAMPLE VI

METHYLOLATION OF POLYACRYLAMIDE 117 ml (4.56 grams) of polymerization reaction solution from Example III is diluted to a total of 500 ml. The Brookfield viscosity of this solution is 96.0 cps at 3 rpm. The solution is adjusted to pH-10.5 with trisodium phosphate and then charged to the reactor. 7.0 ml 37% formaldehyde is added and the temperature is adjusted to 50° C. The reaction is continued for 4 hours, after which time the Brookfield viscosity is 129.0 cps at 3 rpm.

EXAMPLE VII

SULFOMETHYLATION OF POLYACRYLAMIDE 2.66 grams of sodium sulfite is charged to the solution in Example VI. The temperature is adjusted to 75° C. and the pH is 12.3. The reaction is allowed to continue for 3 hours, after which time the Brookfield viscosity is 1060.0 cps at 0.3 rpm.

EXAMPLE VIII

SIMULTANEOUS METHYLOLATION AND SULFOMETHYLATION 117 ml (4.56 grams) of polymerization reaction solution from Example III is diluted to a total of 500 ml. The solution is adjusted to pH-10.5 with trisodium phosphate, then charged to the reactor. 7.0 ml of 37% formaldehyde and 2.66 grams of sodium sulfite are added and the temperature is adjusted to 75° C. The reaction is allowed to continue for 6 hours.

EXAMPLE IX

CORE FLOOD 32 grams of the gross reaction mixture from Example VIII is diluted to 2500 ml with artificial Palestine water to a viscosity of approximately 10.0 cps, and utilized in a core flood experiment as follows: the Berea core is prepared first by saturating with water to determine pore volume (PV), then saturated with crude oil. The core is then waterflooded to residual oil saturation. A micellar system slug 0.03 PV, is injected and 1 PV of the polymer solution is used as the drive fluid.

MODIFICATIONS OF THE INVENTION

It should be understood that the invention is capable of a variety of modifications and variations which will be made apparent to those skilled in the art by a reading of the specification and which are to be included within the spirit of the claims appended hereto.

For example, in some applications, the thickeners disclosed above may be used as mixtures with each other or with thickeners of distinctly different chemical structures such as partially hydrolyzed high molecular weight polyacrylamides, polyethylene oxide, polyvinylpyrrolidones, and polyvinyl carboxylates. In some cases, the thickener may be incorporated into the surfactant slug itself.

Also, the concentrations of polyacrylamide discussed under "Description of the Preferred Embodiments" should be understood to refer to concentration during the injection step. Where desired, the contact between formaldehyde and sulfite and polyacrylamide may be conducted at higher concentrations with subsequent dilution prior to or during injection.

In the supplemented displacement of petroleum, e.g., in secondary or tertiary petroleum recovery processes, the viscosity control agents of the present invention are formulated with water to provide a viscosity which is not substantially less than, and is preferably greater than, the fluids which they are to displace. The displaced fluids may be petroleum itself, petroleum and water (as is the case in tertiary supplemented recovery operations), or may be a slug of primary dispersing agent, e.g., micellar solution, hydrocarbon, or the like. The displacing agents of the present invention may themselves be driven through the formation by the action of a drive fluid, e.g., water with or without conventional thickening agents. Other techniques, e.g., the "tapering" of viscosity by reducing the concentration of the mobility control agent over the period of the injection process can be employed with the mobility control agents of the present invention.

Also, the present invention permits the addition of monomers into the acrylamide monomer solution prior to polymerization so that a copolymer is formed from the polymerization.

What is claimed is:

1. In a process for the recovery of petroleum from formations by injecting aqueous solutions of viscosity-increasing compositions into the formation and displacing same therethrough to recover petroleum from the formation, the improvement comprising in combination:
    a. hydrolyzing acrylonitrile by treatment with sulfuric acid and water in the presence of a polymerization inhibitor to form acrylamide monomer,
    b. neutralizing the acrylonitrile hydrolysis product by treatment with base,
    c. substantially removing the polymerization inhibitor from the acrylonitrile hydrolysis product,
    d. polymerizing the hydrolyzed and neutralized acrylonitrile solution at a temperature in the range of about 10° to about 90° C in the presence of a polymerization catalyst to form polyacrylamide, having a molecular weight of about 1 million to about 100 million,
    e. methylolating the polyacrylamide with about 0.01 to about 10 moles of formaldehyde per mole of acrylamide monomer unit, and thereafter injecting the polyacrylamide into the formation and displacing it into the formation to recover crude oil therefrom.

2. The process of claim 1 wherein said polyacrylamide is sulfomethylated by treating it with about 0.01 to about 10 moles of formaldehyde per mole of acrylamide monomer unit and about 0.1 to to about mole of metal sulfite per mole of acrylamide prior to injecting into said formation.

3. The process of claim 2 wherein the sulfite is selected from the group consisting of: alkali metal sulfites, alkaline earth metal sulfites, alkali metal bisulfites, alkaline earth metal bisulfites, ammonium sulfite, ammonium bisulfite, the pyrosulfites and metabisulfites corresponding to any of the foregoing and mixtures of any of the foregoing, and wherein there are present about 0.01 to about 10.0 moles of formaldehyde and about 0.01 to about 2.0 moles of sulfite per mole of monomer unit in said polymers, and wherein the temperature is in the range of about 0° to about 300° C, and the contact is maintained for a reaction time of about 0.1 to about 100 hours.

4. The process of claim 2 wherein the aqueous solution contains about 50 to about 5000 parts per million by weight of said sulfomethylated polymer, the sulfite is selected from the group consisting of: alkali metal sulfites, alkaline earth metal sulfites, alkali metal bisulfites, alkaline earth metal bisulfites, ammonium sulfite, ammonium bisulfite, the pyrosulfites and metabisulfites corresponding to any of the foregoing and mixtures of any of the foregoing, and wherein there are present about 0.01 to about 10 moles of formaldehyde and about 0.01 to about 2.0 moles of sulfite per mole of monomer unit in said polymer, and wherein the temperature is in the range of about 0° to about 300° C, and each contact is maintained for a reaction time of about 0.0 to about 100 hours.

5. The process of claim 2 wherein there are present about 0.1 to about 5.0 moles of formaldehyde and about 0.05 to about 1.0 mole of sulfite per mole of monomer unit in said polymer, the pH during the contact with the formaldehyde is in the range of about 8.0 to about 10.5, the pH during the contact with sulfite is in the range of about 9.5 to about 13.5, the temperature during the contact with formaldehyde and with sulfite is in the range of about 20° to about 200° C, and the reaction is carried out for about 0.5 to about 50 hours.

* * * * *